US012612230B2

(12) United States Patent
Kern et al.

(10) Patent No.: US 12,612,230 B2
(45) Date of Patent: Apr. 28, 2026

(54) RECYCLABLE POLYPROPYLENE CONTAINER

(71) Applicant: Hoffmann Neopac AG, Thun (CH)

(72) Inventors: Philippe Kern, Münsingen (CH); Peter Bossert, Hünibach (CH)

(73) Assignee: Hoffmann Neopac AG, Thun (CH)

( * ) Notice: Subject to any disclaimer, the term of this patent is extended or adjusted under 35 U.S.C. 154(b) by 344 days.

(21) Appl. No.: 18/275,667

(22) PCT Filed: Feb. 26, 2021

(86) PCT No.: PCT/EP2021/054876
§ 371 (c)(1),
(2) Date: Aug. 3, 2023

(87) PCT Pub. No.: WO2022/179705
PCT Pub. Date: Sep. 1, 2022

(65) Prior Publication Data
US 2024/0294313 A1     Sep. 5, 2024

(51) Int. Cl.
B65D 65/40          (2006.01)
B32B 7/12           (2006.01)
           (Continued)

(52) U.S. Cl.
CPC ................ B65D 65/40 (2013.01); B32B 7/12 (2013.01); B32B 15/085 (2013.01); B32B 15/20 (2013.01);
           (Continued)

(58) Field of Classification Search
CPC .......... B65D 65/40; B65D 35/10; B32B 7/12; B32B 15/085; B32B 15/20; B32B 27/08;
           (Continued)

(56) References Cited

U.S. PATENT DOCUMENTS 3,660,194 A       5/1972   Hoffmann et al.
2022/0032590 A1   2/2022   Kem et al.

FOREIGN PATENT DOCUMENTS

CH          468914        3/1966
WO     2010/135843 A1    12/2010
           (Continued)

*Primary Examiner* — Michael C Miggins
(74) *Attorney, Agent, or Firm* — Anderson Patent Law Firm

(57) ABSTRACT

For recyclability in a high value circular recycling material stream, a fluid-tight collapsible polyolefin container comprises a container body (5) formed of a container laminate (1) that is folded to a container-like body and fixed by sealing overlapping edge regions (2, 3) or by butt welding adjacent edges and optionally coated with a sheathing (4) of polypropylene to form the container body (5), said container body (5) being provided at one open end with a container head formed from polypropylene. The container laminate (1) is a laminate having at least three layers, an inner polypropylene layer (6) and an outer propylene layer (8) and a barrier layer (7) sandwiched between the outer polypropylene layer (8) and the inner polypropylene layer (6), wherein the barrier layer (7) comprises at least one polyolefin comprising oriented barrier foil like a monolayer foil (71) or a coextruded foil (72 with layers 72a, 72b) or a laminate thereof and wherein at least 70% by weight, preferably at least 90% by weight of all polymers of the container are made of polypropylene homopolymer and/or copolymer.

23 Claims, 2 Drawing Sheets

(51) Int. Cl.

| | |
|---|---|
| *B32B 15/085* | (2006.01) |
| *B32B 15/20* | (2006.01) |
| *B32B 27/08* | (2006.01) |
| *B32B 27/30* | (2006.01) |
| *B32B 27/32* | (2006.01) |

(52) U.S. Cl.
CPC ............ B32B 27/08 (2013.01); B32B 27/306 (2013.01); B32B 27/32 (2013.01); *B32B 2250/05* (2013.01); *B32B 2307/516* (2013.01); *B32B 2307/518* (2013.01); *B32B 2307/718* (2013.01); *B32B 2307/7242* (2013.01); *B32B 2307/7376* (2023.05); *B32B 2439/00* (2013.01)

(58) Field of Classification Search
CPC ... B32B 27/306; B32B 27/32; B32B 2250/05; B32B 2307/516; B32B 2307/518; B32B 2307/718; B32B 2307/7242; B32B 2307/7376; B32B 2439/00; B32B 2250/03; B32B 2250/04; B32B 2250/242; B32B 2255/06; B32B 2255/10; B32B 2255/20; B32B 2255/26; B32B 2255/28; B32B 2272/00; B32B 2307/30; B32B 2307/31; B32B 2307/7163; B32B 2307/7265; B32B 2307/732; B32B 2307/75; B32B 2439/40; B32B 2439/70; B32B 2439/80; B32B 2597/00; B32B 27/327; B32B 1/08
See application file for complete search history.

(56) References Cited

FOREIGN PATENT DOCUMENTS

| WO | 2013/004646 A1 | 1/2013 |
| WO | 2014/040195 A1 | 3/2014 |

RECYCLABLE POLYPROPYLENE CONTAINER

TECHNICAL FIELD

The present invention relates to a container with barrier properties and with high polypropylene content, in particular a tube, and a barrier container laminate for manufacturing same. Such container and preferably such laminate can be recycled as such within existing mono-material recycling streams, i.e. without demanding technically challenging and costly material separation.

BACKGROUND ART

Flexible containers, such as collapsible tubes, for substances such as pastes, jellies, emulsions, liquids, foams, powders, etc., with barrier effect, i.e. that are at least partially gas-tight, such as air-tight, and liquid tight, and their production have been heretofore described, e.g. in CH 468 914.

As another example U.S. Pat. No. 3,660,194 discloses a method of producing gas-tight and liquid-tight containers, especially collapsible tubes, wherein a stripe of plastic coated carrier foil, a tube laminate, is bent or wound into the shape of a substantially cylindrical tube, the longitudinal edges of the stripe being arranged in overlapping relationship to form a tube-like body. These longitudinal edges are then heat-sealed and coated with a sheath of plastic to form the tube body. The sheath of plastic covers the overlapping seams and provides a smooth continuous outer surface capable of receiving an imprint. Further, according to this document the amount of plastic material and application thereof to the surface of the tube-like body is controlled such that the outside surface of such tube body, when covered with the plastic sheathing possesses a shape and dimension substantially corresponding to the internal receiving wall of a mold cavity for heading the tube. The tube body, typically after having been cut into finite tube sections, is then inserted at one end into a mold cavity, the outside surface of such tube section snugly fitting in good sealing relationship against the internal receiving wall of the mold cavity. The inner wall of the tube section, at least at the end region thereof received in the mold cavity is freely exposed, so that when moldable material is introduced into the mold cavity it contacts such exposed inner wall, thereby producing a substantially radially directed force applied outwardly against the inner exposed wall of the tube body, urging the outer wall thereof into extreme sealing contact with the internal receiving wall of the mold cavity so that an extremely effective seal appears at the location where the tube section has been inserted into the molding cavity.

Also the container described in WO 2010/135843 comprises a container body formed of a tube laminate, said tube laminate having an at least partially fluid-tight carrier foil sandwiched between thermoplastic semi-rigid or rigid layer material. This tube laminate is folded to a container-like body and sealed in the overlapping edge regions to stabilize the container-like body. This container-like body is then coated with a sheathing of elastomeric thermoplastic material of the same kind or type as the foil material to form a container body that is provided at one open end with a container head formed from thermoplastic material of the same kind or type as the foil material.

All these former container comprise a laminate with a barrier layer, in particular a barrier layer comprising aluminum, SiOx, AlxOy, ethyl vinyl alcohols (EVOH), cycloolefin copolymers (COC) and polyamide (PA). Best fluid-tightness is obtained with metal foils. These laminates or tubes, respectively, are not suitable for being recycled without laborious material separation.

WO 2013/004646 A1 describes a laminate that comprises a thin coating of sol-gel polyvinyl alcohol. However, due to the high solubility of polyvinyl alcohol in water, such material is problematic with regard to longtime stability in humid environment.

Many laminates for polyolefin tubes are based on polyethylene with a high amount of low density polyethylene for good sealability. However, it has been turned out that also collapsible tubes are best recycled via the rigid container route that demands a high amount of high density polyethylene. The use of high density polyethylene, however, is subject to some limitations, in particular with regard to blown film production, that are not found for low density polyethylene. In addition, only low amounts of materials other than polyethylene are accepted and the presence of some material is even excluded.

Since the uses for recycled polyethylene are nevertheless limited, collapsible tubes with better recyclability and broad usability of the recycled material as well as laminates for their production are still needed.

ABBREVIATIONS

PO=polyolefin
PE=polyethylene
LLDPE=linear low density polyethylene 0.915-0.925 g/cm³
mLLDPE=LLDPE from metallocene based catalyst polymerization route enabling high density of up to 0.940 g/cm³ while retaining excellent optical properties such as transparency.
LDPE=low density polyethylene 0.910-0.940 g/cm³
HDPE=high density polyethylene≥0.940 g/cm³
MDPE=medium density polyethylene 0.926-0.940 g/cm³
PP=polypropylene, if not further specified, PP encompasses all PP varieties including polypropylene based copolymers
HOMO-PP=PP homopolymer (encompassing the forms isotactic=iPP, syndiotactic=sPP, atactic=aPP)
COPO-PP=PP copolymer, in general a propylene-ethylene-copolymer
HECO-PP=heterophasic polypropylene copolymer or polypropylene block-copolymer, in general with ethylene content of 1 to 20% by weight, in particular 5 to 15% by weight (wt-%)
RACO-PP=random polypropylene copolymers, in general with ethylene content of 1 to 10% by weight, in particular 1 to 7% by weight (wt-%)
TPE-PP=thermoplastic elastomer on PP basis.
EVOH=ethylene vinyl alcohol copolymer
PVOH=polyvinyl alcohol
PA=polyamide
PET=polyethylene terephthalate
PETG=PET copolyester with second glycol
PLA=polylactic acid
PS=polystyrene
PVC=polyvinyl chloride
PVDC=polyvinylidene chloride
OTR=oxygen transmission rate
MDO=mono-axial/mono-directional oriented
BDO=bi-axial/bi-directional oriented
OPP=oriented polypropylene
BOPP=bi-oriented polypropylene SF=solvent-free
PE-met=metallized PE foil
OPP-met=metallized OPP foil
BOPP-met=metallized BOPP foil
AlxOy=aluminum oxide
SiOx=silicon oxide
PUR=polyurethane

Definitions

Container laminate, in particular tube laminate: foil suitable for the production of collapsible containers like tubes comprising a barrier layer laminated to a polyolefin foil on each of its sides.

Container body or tube body: container/tube like part without shoulder/head.

Collapsible container or tube: the final container with container or tube body and shoulder/head without closure. The collapsible container, especially tube, can have an open end for being filled, in the case of tubes in general opposite of the shoulder/head or it can be filled and—if filled via an open end—said open end sealed.

Barrier layer: encompasses all types of barrier foils optionally provided with one or more functional layers.

Barrier foil: an oriented plastics foil composed of one or more polymeric materials.

Monolayer foil: a barrier foil with one polymer layer only such as an OPP-foil, a BOPP-foil or an MDO-PE-foil.

Coextruded foil: a barrier foil composed of different polymeric materials such as a MDO-PE-foil or an OPP-foil or a BOPP-foil each with an internal barrier layer like an intermediate EVOH-layer and—in general but not mandatory—one or two tie layers.

Barrier foil laminate: laminate of two or more barrier foils, said barrier foils optionally comprising one or more functional layers on at least one of their surfaces.

Functionalized barrier foils: a monolayer barrier foil or a coextruded barrier foil or a barrier foil laminate comprising one of more functional layers on at least one of its surfaces in the case of monolayer foils and coextruded foils or one or more functional layers on at least one of its surfaces and/or one or more intermediate functional layers in case of barrier foil laminates.

Polypropylenes: As far as the recyclability in mono-material recycling streams is concerned and unless otherwise specified, the term polypropylene encompasses homopolymers and/or copolymers as long as at least 80 wt-%, preferably at least 90 wt-%, more preferred at least 93 wt-%, or at least 95 wt-%, or at least 99 wt.-% of the copolymer units are propylene units.

The total polypropylene content of the container, irrespective of whether it is a PP homopolymer or a PP copolymer is at least 70 wt-%, preferably at least 90 wt-%, more preferred at least 95 wt.-%.

Polypropylenes meeting the above criteria—also with respect to recyclability—may comprise additives and/or adjuvants.

%: unless otherwise defined all % are % by weight.

The terms foil and film are used synonymous/interchangeably.

DISCLOSURE OF THE INVENTION

Hence, it is a general object of the invention to provide a preferably gas-tight, such as air-tight and aroma-tight, as well as liquid-tight (further on referred to as fluid-tight) collapsible container, especially a collapsible tube, that is made of thermoplastic material and that can be recycled in polypropylene container recycling streams without any separation step involved.

It is another object of the invention to provide a container body, especially a tube body, of a container such as a tube and/or a container laminate suitable for producing such a container/tube.

Now, in order to implement these and still further objects of the invention, which will become more readily apparent as the description proceeds, the collapsible container is manifested by the features that it comprises a container body formed of a container laminate, said container laminate being folded to a container-like body and fixed by sealing overlapping edge regions or by butt welding adjacent edges, and optionally having an outer surface coated with a sheathing of polypropylene, said container body being provided at one open end with a shoulder/head formed from polypropylene, wherein said container laminate is a laminate having at least three layers, an inner polypropylene layer and an outer polypropylene layer and a barrier layer sandwiched between the outer polypropylene layer and the inner polypropylene layer, wherein the barrier layer comprises at least one polyolefin comprising oriented barrier foil and wherein at least 90% by weight of the container are made of one or more polypropylenes, wherein all polypropylenes are homopolymers and/or copolymers.

In a preferred embodiment, the container body has sealed overlapping edge regions and in an even more preferred embodiment said container body with sealed overlapping regions has the outer surface coated with said sheathing of polypropylene.

In another preferred embodiment, the inside of the container that upon use is in contact with the filled-in goods has an inert surface, such as a food grade or pharma grade compliant surface.

The barrier layer makes the collapsible container air-tight, aroma-tight and liquid-tight (i.e. fluid-tight) and preferably also acts as a migration barrier for e.g. printing substances applied to the outer laminate or sheathing layer of the tube body towards the inside layer of the tube body, allowing for shelf-life extension of packed goods and meeting regulatory packaging safety regarding food product contact. In order to obtain an increased fluid-tightness, the barrier foil comprised in the barrier layer can be provided with one or more functional layer(s) on at least one of its surfaces. Such functional layers are metal layers, metal oxide layers, ceramic layers and barrier lacquer layers. In order to reduce the risk that the container content might come into contact with e.g. the metallization or the metal oxide layer of a functionalized barrier foil even when, for instance, the polyolefin layer applied to the barrier foil is defective and/or contains pores or openings, or in order to further improve the air-tightness of the barrier foil it can be desirable to provide the barrier foil with a barrier lacquer between the side of the container laminate forming the inner side of the container body and the metal or metal oxide or ceramic layer. Such lacquer can e.g. be on the same side of the barrier foil as the metal or metal oxide or ceramic layer or on the opposed side.

For the desired recyclability the container has to be of propylene, i.e. propylene homo and/or copolymer in an amount of at least 70 wt-%, preferably in an amount of at least 90 weight-%, more preferred in an amount of at least 95 weight-% referred to the weight of the container body and the closure and preferably of the container body alone, most preferred of the laminate. Further recommendations for good to very good recyclability and broadly usable recycled polypropylene are:

TABLE 1

| Demands for polypropylene recycling of rigid containers | |
|---|---|
| PP homopolymers and copolymers with at least 90 wt-% propylene units | ≥90%, ideally ≥95% |
| PET, PVC, PVDC, biodegradable or compostable polymers | not tolerated |
| paper | not tolerated |
| Al foil | not tolerated |
| barrier materials like EVOH, PA, acrylic, PVOH, SiOx, AlxOy, metallization, water based coatings | EVOH ≤6% tolerated, but to be minimized, ≤1% preferred; others to be minimized. |
| Density | preferably ≤0.97 g/cm3 |
| Polyurethane and acrylic based adhesives | to be minimized |
| additives and fillers | OK if minimized and overall density of all materials is ≤0.97, preferred ≤0.95 g/cm3 |
| Print, inks, lacquers | to be minimized |
| labels | Only if PP based |
| Ash content | ≤2% w/w |

A more detailed Listing is found in Table 2 (Values indicated with * are expected to be modified by larger accepted quantities in the near future).

PP copolymers with lower sealing initiation temperature and melt temperature in comparison to PP homopolymers are preferred for sealable layers.

In addition, PP has further advantages, namely:

PP foils and PP extrusion layers have better transparency than HDPE foils or extrusion layers which in the case of metallized barrier foils is advantageous since the metallization is visible without any opacity.

On a PP based laminate "soft touch" extrusion layers can be applied. Such extrusion layers are mainly of propylene-ethylene-copolymers that fall under the PP definition and that mainly adhere to PP surfaces. Therefore tubes with a "soft touch" outer layer like a sheathing do not affect the recyclability of PP tubes and such outer layer has a velvet like touch and a classy appearance.

PP tubes can be produced with sheathing and heading equipment also suitable for processing LDPE and MDPE.

In a preferred embodiment the container laminate itself already meets the criteria indicated in Tables 1 and 2 above, i.e. at least 70 weight-%, preferably at least 90 weight-%, more preferred at least 95 weight-% referred to the weight of the container laminate are of one or more polypropylenes.

The barrier foils are oriented foils based on polyolefins. In comparison with non-oriented foils at a given thickness

TABLE 2

| according to RecyClass "PP colored containers guidelines Status February 2021": | | | |
|---|---|---|---|
| | Preferred | Accepted | Not accepted |
| Material Composition | PP content >90%, preferably >95% | | multilayers with PLA, PVC, PET, PETG |
| Colours | All colours | | |
| Barrier | preferred no EVOH | EVOH ≤1%* | EVOH >1%*, PA, PVDC; aluminium |
| Additives | Additives that are unavoidable in processing like stabilizers, antioxidants, lubricants nucleating agents, peroxides) and density remains <0.97 g/cm³ | Mineral fillers (CaCO₃, talc) not increasing density to more than 0.97 g/cm³ | Additives changing the material density to >1 g/cm³; Flame retardant additives, plasticizers; Bio-/oxo-/photodegradable additives |
| Closure System | PP | HDPE, LDPE, LLDPE, MDPE, PET, PETG, PLA (all with density >1 g/cm³ | Non-PO and/or foams with density <1 g/cm³; Metal like aluminum, foiled paper, PVC, PS |
| Liners, Seals and Valves | PP and/or TPE-PP | HDPE, LDPE, LLDPE, MDPE, PET, PETG, PLA (all with density >1 g/cm³; removable aluminium lidding; removable silicon with a density >1 g/cm³ | Non-PO and/or foams with density <1 g/cm³; Any other TPE Metal like aluminum, foiled paper, PVC, PS |
| Labels and/or sleeves | PP (all with density <1 g/cm³) with a print and/or barrier that does not hinder the recognition of the underlaying PP-polymer | Labels/sleeves in PE (with density <1 g/cm³); Labels/sleeves in PET, PETG, PLA (all with density >1 g/cm³); Labels in Paper without fibreloss; PO foamed labels; all with a size, a print and/or barrier that does not hinder the recognition of the underlaying PP-polymer, preferably less than 50% surface coverage | Labels/sleeves that hinder the recognition of the PP; Labels/sleeves in non_PO materials with density <1 g/cm3; Paper labels with fibreloss during recycling process; Aluminium labels/sleeves; Metallised labels/sleeves; labels /sleeves of PVC, PS; heavily inked sleeves |
| Adhesives for labels | water soluble or water releasable adhesives (at less than 40° C.) | Pressure sensitive labels | non water soluble, non water releasable adhesives |
| Other components | PP | PE with density <1 g/cm³; PET, PETG, PLA all with density >1 g/cm³ | Aluminium, PVC, glass components, PS; non-PO and/or foams with density <1 g/cm³ |

The quality of the recycled PP material can be evaluated according to the "Recyclability Evaluation Protocol for PP Containers-Standard Laboratory Practice", Version 1.0, published on 16 Jun. 2020 by RecyClass™, c/o Plastics Recyclers Europe, Avenue de Broqueville 12, 1150 Brussels—Belgium.

Besides of PP homopolymers also PP copolymers with a substantial amount of up to 20% copolymerized non-PP units can be recycled as polypropylene, i.e. without causing problems in reusing the recycled granulates.

oriented foils have higher stiffness for handling and coating. Oriented films have higher crystallinity resulting in better barrier function and an improved surface for being coated.

Dependent on the demanded fluid-tightness, different embodiments of the barrier layer are preferred. The polyolefin comprising and oriented barrier foil can be a monolayer foil or a coextruded foil comprising at least two different materials. The polyolefin comprising barrier foil can be provided with a metal layer or a metal oxide layer or a ceramic layer on one or both sides and/or with a barrier lacquer layer. In case of critical content of a tube, such as in case of pharmaceuticals, it is preferred that a possible metal or metal oxide layer is on the side of the barrier foil directed towards the outside of the tube body and therefore it is preferred to have a barrier lacquer applied on the inner side of the barrier foil or on the outer side between the barrier foil and the metal or metal oxide layer, although for other applications a sequence "polyolefin comprising barrier foil—metallization or metal oxide or ceramic layer—barrier lacquer" may be preferred. Such optionally functionalized barrier foils can be the barrier layer in the container laminate.

In an alternative embodiment two or more optionally functionalized barrier foils of the same or different type can be laminated by means of an adhesive to form a barrier foil laminate used as barrier layer in a container laminate.

The barrier layer can be a polyolefin comprising barrier foil, such as a polyolefin monolayer foil or a polymeric coextruded foil, or a barrier foil laminate composed of two or more barrier foils of same or different kind. The polyolefin comprising and oriented barrier foil can optionally also be provided with one or more functional layer (s), be it used as such or in a barrier foil laminate.

Some embodiments of such barrier layers are further detailed below:

barrier foil—metal or metal oxide or ceramic layer barrier foil—barrier lacquer barrier foil—barrier lacquer—metal or metal oxide or ceramic layer barrier foil—metal or metal oxide or ceramic layer—adhesive layer—barrier foil—metal or metal oxide or ceramic layer barrier foil—barrier lacquer-metal or metal oxide or ceramic layer-adhesive layer—barrier foil—metal or metal oxide or ceramic layer.

Preferred PP containers are PP tubes.

A presently preferred monolayer foil is a mono-axial, also termed mono-directional, oriented PP-foil, generally known as OPP-foil, or a bi-axial or bi-directional oriented PP-foil, also known as BOPP-foil. Also acceptable are mono-axial or mono-directional oriented (MDO) PE-foils. Such foils are commercially available. In general mono-axial oriented foils are produced in that, during the orientation process, a blown film is stretched between two rollers which run at different speeds.

In the following description, the term MDO will be used for mono-axial or mono-directional oriented polyolefin foils and the term BDO for bi-axial or bi-directional oriented polyolefin foils.

MDO foils are ideally produced from either PE, especially HDPE or MDPE or LLDPE, optionally from a mixture of HDPE and LLDPE or HDPE and MDPE or HDPE and LDPE, preferably with a density of the PE or PE mixture of at least $0.940$ g/cm$^3$, or from PP, also termed an OPP-foil. A suitable BDO foil is a PP-foil, also termed a BOPP-foil. An OPP- or BOPP-foil in case of PP-tubes has the advantage over an MDO-PE-foil that it is not limited in thickness due to the demand that at least 70 wt-%, preferably 90 wt-% of the container must be PP. Suitable OPP foils or BOPP foils have a thickness of 15 to 30 µm, preferably 18 to 25 µm such as 16 to 20 µm.

A further advantage of OPP- or BOPP-foils is their broad commercial availability (OPP-foils e.g. from Jindal Films or Toppan), which is not the case yet for MDO-PE or MDO-PE EVOH foil (commercial availability just recently started).

Presently preferred coextruded oriented foils comprise an EVOH-layer sandwiched between two polyolefin layers. A presently preferred, since commercially available MDO-EVOH-coextruded film is a MDO-PE-EVOH-foil with an EVOH layer between two PE-layers. Such material has an improved air-tightness compared to a pure MDO material of the same thickness.

A disadvantage of MDO-PE- and MDO-PE-EVOH-foils is that their thickness is limited in order to guarantee the limit of ≤30%, preferably ≤10%. For PP-tubes with a MDO-PE- or MDO-PE-EVOH-foil sandwiched between two PP-foils, a thickness of the MDO-PE- or MDO-PE-EVOH-foil of 15 to at most 30 µm, such as 18 to at most 25 µm, in case of a PP foil or of a PP foil and a PP-sheathing of about 180 µm total thickness is acceptable for the preferred ≤10% for a tube also comprising a PP shoulder/head and a PP closure.

An oriented MDO foil with additional central barrier can be produced starting from a 3 to 5 layer coextruded blown film, the number of layers depending from the adherence of the layers to one another. This is particularly important with regard to the forces acting on the film during the orientation step. Therefore presently preferred is a five layer coextrudate having the layers PO/tie/EVOH/tie/PO, wherein the tie layer is a modified polyolefin with functional groups, designed to bond to a variety of polyolefins, e.g. a maleic anhydride grafted PP material. In general the ratio of EVOH to the sum of the tie layers is at most 2. Said tie is applied in a thickness of 5-10 µm each. In general an e.g. 60-100 µm blown foil is produced that directly after the blowing process is unidirectionally (monodirectionally) stretched. The stretching factor in general is 3 to 5. In case of a 60 µm foil stretched with a factor 3, a 20 µm MDO foil is obtained. By this process, the resulting EVOH internal barrier layer has a thickness of only about 1 to 3 µm and the tie layers of about 1.6. to 3.3 µm each. The stretching thus keeps the amount of non-polypropylene and in particular also the amount of non-polyolefin materials very low with a nevertheless good oxygen-barrier effect. This good barrier effect is i.a. due to the enhanced crystallinity of the PO such as PE and EVOH materials due to the orientation of the MDO foil. Measurements of the barrier effect gave for a MDO-PE/tie/EVOH/tie/PE-foil an OTR of approx. 10 ml/(m$^2$×d×bar) measured at 23° C./50% r.h. Compared to a not stretched PE foil without EVOH barrier (approx. 5000 ml/(m$^2$×d×bar)) this is a significant improvement.

An oriented PO barrier foil thus in general has a thickness of 15 to 30 µm, preferably 18 to 25 µm for MDO-PE and BOPP without or with EVOH layer and 15 to 25, preferably 16 to 20 µm for OPP-films. The EVOH layer in general has a thickness of 1 to 5 µm, preferably 2 to 4 µm.

A much preferred metal layer for metallization is aluminium and preferred ceramic and metal oxides are silicon oxides (SiOx) and aluminium oxides (AlxOy). A suitable thickness of a metallization, a metal oxide or a ceramic layer, i.e. for obtaining a good barrier, is about 20-80 nm, such as 20-50 nm, or equal to an optical density of 2.0 to 2.4 for a metal layer. For a cured barrier lacquer about 1 to 3 g/m$^2$, preferably 1 to 2 g/m$^2$ is suitable.

Suitable barrier lacquers are water insoluble lacquers, e.g. PVOH based, preferably lacquers with modified PVOH as sole polymer. PVOH barrier lacquers in general are used for reducing oxygen permeability. Due to their highly reduced water solubility they are also less swelling and therefore exhibit long lasting barrier effect. Enhanced water resistance can e.g. be achieved by modification such as esterification of acetate groups remaining from the production process. PVOH lacquers are usually applied in amounts resulting in a final (cured) weight of 1 to 3 g/m$^2$, or a thickness of about 1 to 3 µm, preferably 1 to 2 g/m$^2$, or a thickness of about 1 to 2 µm, such as about 1 g/m$^2$, or a thickness of about 1 µm.

Presently preferred polyolefin comprising barrier foils are

OPP- or BOPP-foils,

OPP- or BOPP-foils with metallization on at least one surface,

OPP- or BOPP-foils with $SiO_x$ on at least one surface,

OPP- or BOPP-foils with $Al_xO_y$ on at least one surface,

MDO-PE-EVOH-foils,

MDO-PE-EVOH-foils with metallization on at least one surface,

MDO-PE-foils with metallization on at least one surface.

Such foils optionally can also comprise one or two lacquer layers.

Some specific foils (not the laminates) are commercially available, e.g.

OPP- or BOPP-foils, preferably in a thickness of 15 to 20 μm, such as 16 to 20 μm, on one side provided with an AlxOy or SiOx or metal, like aluminium, layer or thin film coating, respectively, or aluminium coated BOPP in a thickness of about 16 to 22 μm, like 18 μm.

For PP tubes also preferred barrier layers are OPP-EVOH-films or BOPP-EVOH-films, optionally with a metallization or a ceramic layer like a $SiO_x$ layer or a metal oxide layer like an $Al_xO_y$ layer and/or a lacquer layer on at least one surface.

A barrier foil laminate can be obtained by laminating two or more barrier foils by means of an adhesive. In general two monolayer foils are laminated such as two OPP-foils, two MDO-PE-foils, or one MDO-PE-foil and one OPP-foil, or two coextruded foils like two MDO-PO-EVOH foils or one MDO-PO-EVOH foil with one MDO-PE-foil or one OPP-foil, wherein all barrier foils can be provided with one or more functional layer(s).

An example of a functionalized barrier foil laminate is composed of an OPP-foil with an Alxy or SiOx layer on one side and an OPP-foil with a metal layer on one side, said foils being laminated together with an adhesive.

Suitable adhesives are polyurethane based adhesives. Such adhesives are preferably applied in an amount (dry weight) of solvent-free adhesive of 1.5 to 2.2 $g/m^2$ or about 1.5 to 2.2 μm or in an amount (dry weight) of solvent-based adhesive of 2.5 to 4.5 $g/m^2$ or about 2.5-4.5 μm.

While PUR based solvent-free (including water-based) adhesives are preferred due to their lower thickness and the reduced environmental impact, PUR based solvent-based laminating adhesives are preferred in specific cases, as in case of water vapour sterilization, in spite of their disadvantage of liberating volatile organic compounds and the higher amount of about 2.5 to 4.5 $g/m^2$ (dry weight) that has to be applied.

The same adhesives in the same thickness range can also be used to laminate the barrier layer between two polpropylene monofoils and/or coextruded foils. Preferred polyolefin foils are PP- or PP-EVOH-foils formed in a blown film extrusion process or a blown film coextrusion process. Dependent on the intended use of the tube container, at least the inner foil may be made of or—in the case of a coextruded inner foil—have as innermost layer a layer of pharmaceutical grade polypropylene.

The inner and/or the outer foil can independently of each other be mono-foils or coextruded foils. Coextruded foils can be coextruded foils of the same material but with different thicknesses such as 15 μm/30 μm/15 μm, coextruded foils of different polypropylenes such as different HOMO-PP or one or more HOMO-PP and one or more COPO-PP like RACO-PP and/or HECO-PP or different COPO-PP of same or different thickness, or one or more polypropylenes and an internal barrier layer and optionally and preferably one or more tie layers.

A preferred inner foil with an internal barrier layer sandwiched between two polyolefin layers is an EVOH layer sandwiched between two PP layers. Such a foil can be a three, four or five layer foil with zero to two tie layers like a PP-tie-EVOH-tie-PP-foil. A suitable thickness of the EVOH layer is 1 to 10 μm, prefered 5 to 8 μm, more preferred 5 to 6 μm. A suitable tie layer between the EVOH layer and the PP layer is maleic anhydride grafted PP material with an independent thickness of 1 to 10 μm each, while the same thickness of both tie layers is presently preferred. The PP layers can be of one or more HOMO-PP, of one or more COPO-PP or of a combination of one or more HOMO-PP and one or more COPO-PP. A suitable thickness of each PP-layer is 15 to 100 μm.

For the sealable inside foil a COPO-PP foil or a PP foil with barrier layer and innermost COPO-PP is preferred, since COPO-PP in general is better sealable and has better stress crack resistance compared to HOMO-PP, although HOMO-PP can also be used.

For the inside foil of such a container, the use of a coextruded foil comprising an internal barrier layer such as an EVOH-layer of e.g. 1 to 10 μm, preferably 5 to 8 μm, like about 6 μm between two PP layers (with the PP as specified above) can be advantageous to reduce permeability of the inner film towards compounds of the content that might affect the adhesive and thus affect the life-time of the container. A presently preferred PP-EVOH-foil is a five layer foil of PP/tie/EVOH/tie/PP.

The inner or inside foil, in general, has an overall thickness of 100 to 160 μm, preferably 130 to 160 μm in case of a laminate tube without sheathing and 60 to 100 μm, preferably 80 to 100 μm or 80 to 90 μm if additionally a sheathing is applied. In case of a coextruded inner foil with an EVOH layer sandwiched between two PP layers, the PP layer in contact with the content usually is thicker and in general has 1.5 to 2 times the thickness of the layer in contact with the barrier layer.

A presently preferred outer foil is a three layer PP foil, such as a three layer foil with each layer having the same composition but different thickness or the layers having different PP composition and the same or different thicknesses or the layers having the same or different PP composition, the same or different layer thicknesses and e.g. different additives. Like functional additives or coloration. Additives as well as coloration can and in general are added via additive masterbatch addition and/or colorant masterbatch addition in the individual layers. Such foils are ideally produced by a blown film process.

In case of colored containers, in general 1 to 2 layers of a preferred three layer foil is/are colored, e.g. with a titanium oxide containing master batch for obtaining a white appearance.

The outside foil, in general, has an overall thickness of 80 to 120 μm, preferably 100 to 120 μm in case of a laminate tube without sheathing and 40 to 100 μm, preferably 50 to 70 μm if additionally a sheathing is applied.

Suitable container laminates have the following structure polypropylene foil—adhesive—barrier layer composed of one or more optionally functionalized barrier foils—adhesive—polypropylene foil.

Such foils are preferably produced by a lamination procedure using a laminating adhesive as indicated above, preferably a PUR-based adhesive. The lamination procedure as such is performed as known to the skilled person. If e.g. sterilization by means of high temperature water vapor is intended, solvent based adhesives are preferred, for other applications solvent-free adhesives are preferred due to lower layer thickness and thus lower non-PP material contribution besides of lower environmental impact.

Preferred PP-laminates have a thickness of approx. 110 to 300 μm, such as 60 to 160 μm for inner foils and 40 to 120 μm for outer foils. For tubes with a sheathing usually a foil thickness of 40 to 120 μm, preferably 60 to 90 μm, such as inner foil 90 μm and outer foil 60 μm is used.

The shoulder/head of the tube container is made of PP. Dependent on the application, COPO-PP or HOMO-PP are preferred. Due to its lower notch impact strength HOMO-PP is preferred for breakable (e.g. by turning) first opening functions integrated in the tube shoulder.

It is preferred to also have PP closures.

Labelling of such tubes is also admissible as long as within the criteria indicated in Table 2. Such labelling preferably is either applied onto the sheathing or outer PP layer of the laminate in case no sheathing is applied or by means of a PP based label/tag.

As indicated above, for recyclability a broad range of PP can be used. However, it is preferred to use PP-materials with similar melt flow index everywhere in the tube.

A method suitable and preferred for manufacturing fluid-tight containers or tubes of the present invention is essentially described in U.S. Pat. No. 3,660,194 that is incorporated herein by reference in its entirety. Said method has already been outlined in the state of the art chapter above.

The laminates described above can be used for making barrier containers, in particular barrier tubes without and with sheathing. Preferred laminates have from inside to outside the following structure:

PP or PP-EVOH—barrier layer—PP, such as PP or PP-EVOH—adhesive-barrier layer—adhesive—PP, with the barrier layer being an optionally functionalized MDO or BDO monofilm or coextruded film, such as MDO-PE, MDO-PE-EVOH, OPP or BOPP with the optional functionalization being applied to at least one surface and being selected from the group comprising metallization, ceramic layer, metal oxide layer, lacquer layer and combinations thereof.

BRIEF DESCRIPTION OF THE DRAWINGS

The invention will be better understood and objects other than those set forth above, will become apparent when consideration is given to the following detailed description thereof. Such description makes reference to the annexed drawings showing schematic sectional view through a tube foil or tube laminate, respectively, formed from the indicated foils (from inside to outside with a slash indicating an adhesive layer) wherein.

MODES FOR CARRYING OUT THE INVENTION

As indicated above, one subject matter of the present invention is a recyclable container, in particular a tube comprising a container, preferably a container body and most preferred a container laminate that is at least 70% PP, preferably at least 90% PP. Some presently preferred container laminates are shown in the Figures. In some embodiments the 90% PP (comprising COPO-PP) are only obtained for the container (laminate with sheathing and shoulder/head and optionally also closure) or the container body (laminate with sheathing only).

Figure 1:
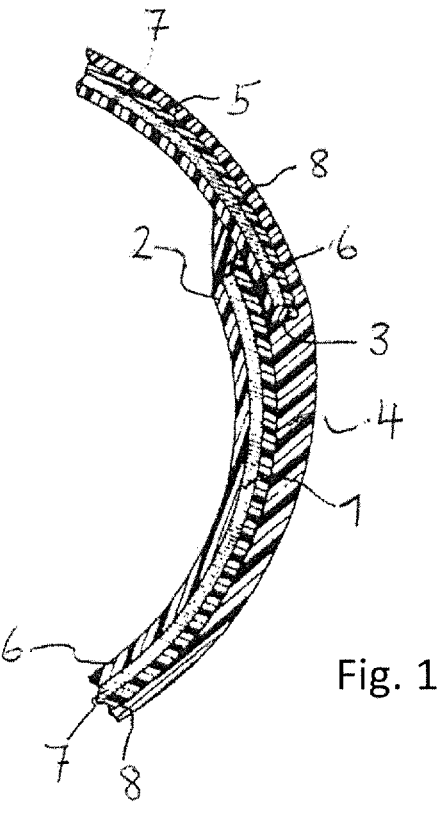
FIG. 1 is an enlarged fragmentary sectional view of the container or tube body prior to the heading thereof, and wherein the thickness of the various layers of the tube have been exaggerated appreciably for the purpose of clarity and simplification in explanation of the invention.

FIG. 1 is an enlarged fragmentary sectional view of the container or tube body showing the seam section wherein overlapping edges 2 and 3 of the container laminate 1 are sealed and wherein the whole body, in particular also the seal are coated with a sheathing 4. The container laminate 1 is shown as three layer material with an inner polypropylene layer 6, an outer polypropylene layer 8 and a barrier layer 7 sandwiched between these two layers.

Suitable materials for preparing tubes of the invention are listed below:

Inner, Sealable Foil of the Laminate

A polypropylene random copolymer with ethene; melt flow rate (ISO 1133-1, 230° C., 2.16 kg) 1.8 g/10 min, or, preferred, Laminated inner foil with PP/tie/EVOH/tie/PP with PP as defined above, a total thickness of about 90 μm, therefrom about 6 μm EVOH and about 4 μm each the tie layers.

Barrier Foil

OPP or BOPP each with one surface metallized (OPP-met or BOPP-met) or

OPP or BOPP each with ceramic or metal oxide layer on one surface (OPP-SiOx or BOPP-SiOx, OPP-AlxOy or BOPP-AlxOy) or OPP or BOPP each with barrier lacquer on one surface or MDO-PE-EVOH with one surface metallized (MDO-PE-EVOH-met)

MDO-PE-EVOH with ceramic or metal oxide layer on one surface (MDO-PE-EVOH-SiOx, MDO-PE-EVOH-AlxOy) or MDO-PE-EVOH with barrier lacquer on one surface or MDO-PE with one surface metallized (MDO-PE-met)

MDO-PE with ceramic or metal oxide layer on one surface (MDO-PE-SiOx, MDO-PE-AlxOy) or MDO-PE with barrier lacquer on one surface

Outer, Sealable Foil of the Laminate

Coextruded foil with an outermost layer of a polypropylene random copolymer with ethene with melt flow rate (ISO 1133, 230° C., 2.16 kg) 1.5 g/10 min, and two layers of a heterophasic polypropylene copolymer with ethene and high cristallinity; melt flow rate (ISO 1133, 230° C., 2.16 kg) 3 g/10 min total thickness about 60 μm

Extrusion Layer (Sheathing)

either of soft PP, e.g. an optionally and preferably transparent random-heterophasic polypropylene copolymer with ethene; melt flow rate (ISO 1133, 230° C., 2.16 kg) 3.9 g/10 min, or optionally and preferably transparent random-copolymer with ethene; melt flow rate (ISO 1133, 230° C., 2.16 kg) 1.8 to 1.9 g/10 min.

a "soft film" copolymer material with ethene resulting in a "soft touch" surface; melt flow rate (ISO 1133-1, 230° C., 2.16 kg) 0.8 g/10 min

Tube Shoulder a polypropylene random copolymer with ethene; melt flow rate (ISO 1133-1, 230° C., 2.16 kg) 1.8 g/10 min, or a polypropylene homopolymer; melt flow rate (ISO 1133-1, 230° C., 2.16 kg) 23 g/10 min a mixture 50/50 of a HOMO-PP with melt flow rate (ISO 1133, 230° C., 2.16 kg) 6 g/10 min and a "soft film" copolymer material with ethene and melt flow rate (ISO 1133-1, 230° C., 2.16 kg) 0.8 g/10 min.

Closure usually a HOMO-PP with higher melt flow rate/index for injection molding like a HOMO-PP with melt flow rate (ISO 1133, 230° C., 2.16 kg) 6 to 9 g/10 min or a polypropylene random copolymer with ethene; melt flow rate (ISO 1133-1, 230° C., 2.16 kg) 1.8 g/10 min.

Figure 2:
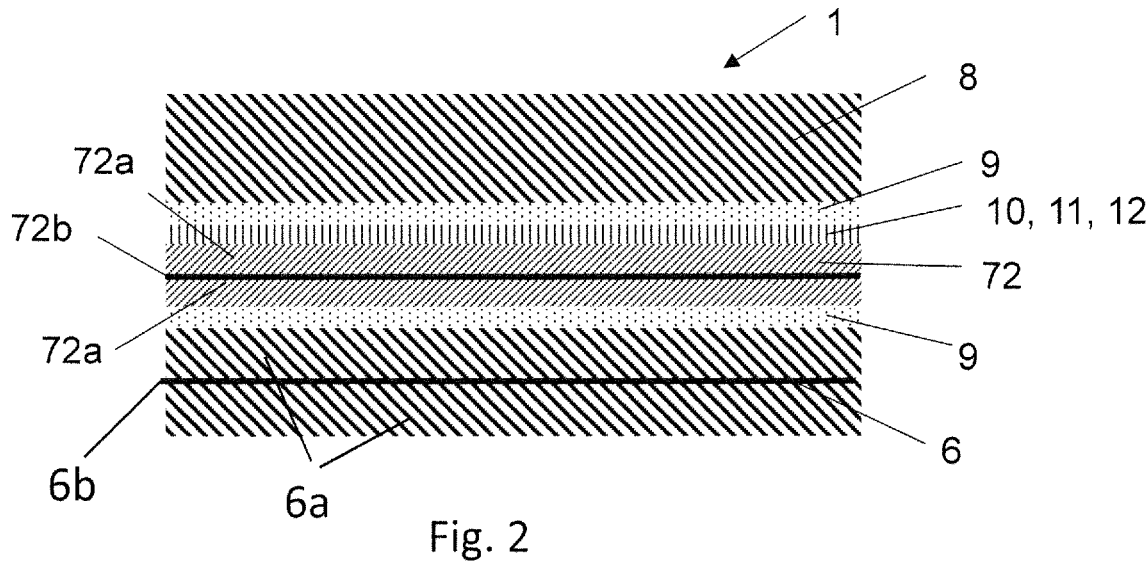
FIG. 2 is PP-EVOH/MDO-PE-EVOH+metallization (or metal oxide or ceramic or barrier lacquer)/PP.

FIG. 2 shows a preferred container laminate 1 with—from inside to outside—PP-EVOH 6 (PP layers 6a, EVOH layer 6b)/adhesive 9/MDO-PE-EVOH 72 (PE layer 72a, EVOH layer 72b)+metallization 10 (or metal oxide or ceramic layer 11 or lacquer layer 12)/adhesive 9/PP 8.

A presently preferred embodiment of the above material with a thickness of approx. 170 µm is composed as follows from inside PE (6) to outside PE (8):

90 µm PP-EVOH coextruded film with an internal EVOH layer of about 6 µm thickness and two tie layers of 4 µm each—SF polyurethane based adhesive (approx. 1.5 g/m²)—20 µm MDO-PE-EVOH with metallization (or metal oxide or ceramic layer or lacquer layer)—SF polyurethane based adhesive (approx. 1.5 g/m²)—60 µm PP.

The PP-EVOH layer and the MDO-PE-EVOH layer each in addition comprises two tie layers between EVOH and PE.

In a preferred embodiment, a tube made of such a laminate has a shoulder and a closure and preferably also a sheathing of PP.

Figure 3:
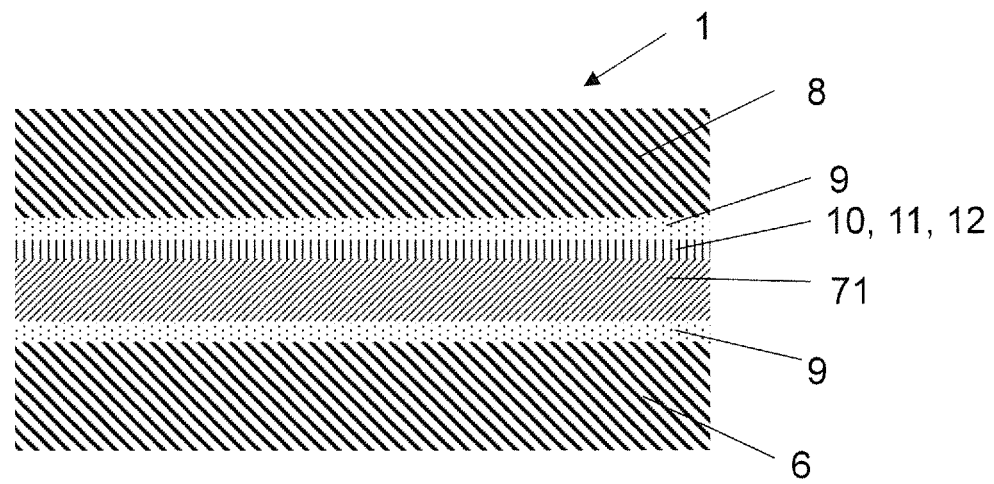
FIG. 3 is PP/BOPP or OPP or MDO-PE+metallization (or metal oxide or ceramic or barrier lacquer)/PP.

FIG. 3 shows a further laminate with—from inside to outside—PP 6/adhesive/OPP or BOPP or MDO-PE 71+metallization 10 (or metal oxide or ceramic layer 11 or barrier lacquer layer 12)/PP 8.

A presently preferred embodiment of the above material with a thickness of approx. 170 µm is composed as follows:

90 µm PP—SF polyurethane based adhesive (approx. 1.5 g/m²)—18 µm BOPP (or OPP or MDO-PE) with metallization (or metal oxide or ceramic layer or lacquer layer)—SF polyurethane based adhesive (approx. 1.5 g/m²)—60 µm PP.

In a preferred embodiment, a tube made of such a laminate has a shoulder and a closure and preferably also a sheathing of PP.

Figure 4:
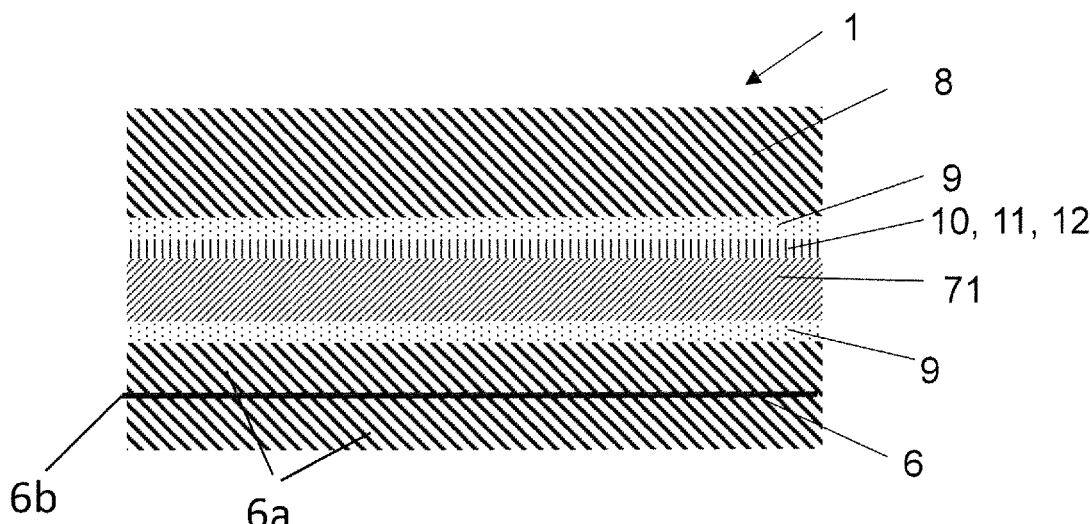
FIG. 4 is PP-EVOH/BOPP or OPP or MDO-PE+metallization (or metal oxide or ceramic or barrier lacquer)/PP.

FIG. 4 shows a further laminate with—from inside to outside—PP-EVOH 6 (PP layers 6a, EVOH layer 6b)/adhesive 9/OPP or BOPP or MDO-PE 71+metallization 10 (or metal oxide or ceramic layer 11 or lacquer layer 12)/PP 8.

A presently preferred embodiment of the above material with a thickness of approx. 170 µm is composed as follows:

90 µm PP-EVOH coextruded film with an internal EVOH layer of about 6 µm thickness and two tie layers of 4 µm each—SF polyurethane based adhesive (approx. 1.5 g/m²)—18 µm BOPP (or OPP or MDO-PE) with metallization (or metal oxide or ceramic layer or lacquer layer)—SF polyurethane based adhesive (approx. 1.5 g/m²)—60 µm PP.

The PP-EVOH layer and the MDO-PE-EVOH layer each in addition comprises two tie layers between EVOH and PE.

In a preferred embodiment, a tube made of such a laminate has a shoulder and a closure and preferably also a sheathing of PP.

If no sheathing is applied, it is preferred that the outer and/or the inner PP layer of the laminate is thicker.

With regard to the barrier effect, a coextruded barrier foil is preferred, namely a foil with a highly oriented EVOH layer with small thickness (1-3 µm) within a MDO (mono-directionally oriented) PP or PE foil or within a BDO (bi-directionally oriented) PP foil. With regard to ready availability, presently an MDO-PE-EVOH foil is preferred.

The barrier effect of any of the polymeric barrier foils can be enhanced by applying at least one functional layer selected from a barrier lacquer, a metallization like Al and/or a metal oxide or ceramic thin film barrier like AlxOy or Siox.

The adhesive layers can be the same or different but preferably are the same and much preferred are two-component polyurethane based and solvent-free, although solvent based can be preferred for specific applications.

While there are shown and described presently preferred embodiments of the invention, it is to be distinctly understood that the invention is not limited thereto but may be otherwise variously embodied and practiced within the scope of the following claims.

The invention claimed is:

1. A fluid-tight collapsible polyolefin container that comprises a container body (5) formed of a container laminate (1), said container laminate (1) being folded to a container-like body and fixed by sealing overlapping edge regions (2, 3) or by butt welding adjacent edges, and optionally having an outer surface coated with a sheathing (4) of polypropylene, said container body (5) being provided at one open end with a shoulder/head formed from polypropylene, wherein said container laminate (1) is a laminate having at least three layers, an inner polypropylene layer (6) and an outer polypropylene layer (8) and a barrier layer (7) sandwiched between the outer polypropylene layer (8) and the inner polypropylene layer (6), wherein the barrier layer (7) comprises at least one, optionally coextruded, polyolefin comprising oriented barrier foil (71, 72) and wherein at least 70% by weight of the container are made of one or more polypropylenes, wherein all polypropylenes are homopolymers and/or copolymers.

2. The collapsible container of claim 1, wherein the polyolefin is selected from polyethylene, in particular MDPE and/or HDPE, and polypropylene, in particular polypropylene, said polypropylene being selected from homopolymers and/or copolymers.

3. The collapsible container of claim 1, wherein at least 90% by weight, preferably at least 95% by weight of the container laminate are made of polypropylene, said polypropylene being selected from homopolymers and/or copolymers.

4. The collapsible container of claim 1, wherein the inner polypropylene layer (6) is a coextruded polypropylene foil, in particular a coextruded polypropylene foil comprising an internal barrier layer, in particular an EVOH layer, much preferred a PP-tie layer-EVOH-tie layer-PP foil.

5. The collapsible container of claim 1, wherein the outer polypropylene layer (8) is a coextruded polypropylene foil.

6. The collapsible container of claim 1, wherein the container body (5) comprises a sheathing (4).

7. A container body for the collapsible container of claim 1 with a container laminate (1) that is a laminate having at least three layers, an inner polypropylene layer (6) and an outer polypropylene layer (8) and a barrier layer (7) sandwiched between the outer polypropylene layer (8) and the inner polypropylene layer (6), wherein the barrier layer (7) comprises at least one, optionally coextruded, polyolefin comprising oriented barrier foil (71, 72), said container body optionally being provided with a sheathing of polypropylene, wherein at least 70% by weight of the container body are made of one or more polypropylenes, wherein all polypropylenes are homopolymers and/or copolymers.

8. The collapsible container of claim 1, wherein at least 90% by weight of the container or at least 95% by weight of the container are made of one or more polypropylenes.

9. The collapsible container of claim 1, wherein the polyolefin comprising oriented barrier foil (71, 72) is a polymeric coextruded foil (72), preferably a polymeric coextruded foil comprising an ethylene vinyl alcohol layer between two polyolefin layers,
    in particular a mono-directional oriented polyethylene-ethylene vinyl alcohol copolymer (MDO-PE-EVOH) foil with an EVOH layer between two PE-layers and preferably a PE-tie layer-EVOH-tie layer-PE foil.

10. The collapsible container of claim 9, wherein the polymeric coextruded barrier foil has a thickness in the range of 15 to 30 μm.

11. The collapsible container of claim 10, wherein the polymeric coextruded barrier foil has a thickness in the range of 18 to 25 μm.

12. The collapsible container of claim 1, wherein the polyolefin comprising oriented barrier foil is an oriented polyolefin monolayer foil (71), preferably a monolayer foil selected from a mono-directional oriented polypropylene (OPP) foil, a bi-directional oriented polypropylene (BOPP) foil, and a mono-directional oriented polyethylene-foil (MDO-PE), in particular a monolayer foil selected from a mono-directional oriented polypropylene (OPP) foil and a bi-directional oriented polypropylene (BOPP) foil.

13. The collapsible container of claim 12, wherein the polyolefin monolayer foil (71), has a thickness in the range of 15 to 30 μm.

14. The collapsible container of claim 13, wherein the polyolefin monolayer foil (71) has a thickness in the range of 16 to 20 μm.

15. The collapsible container of claim 1, wherein the polyolefin comprising oriented barrier foil (71, 72) comprises at least one functional layer on at least one of its surfaces, said one or more functional layers being selected from the group consisting of metal layers (10) and metal oxide or ceramic layers (11), layers of barrier lacquers (12), combinations of a layer of barrier lacquer (12) and a metal layer (10) and combinations of a layer of barrier lacquer (12) and a metal oxide or ceramic layer (11).

16. The collapsible container of claim 15, wherein the one or more functional layers have a thickness of 5 to 200 nm and about 1 to 3 g/m².

17. The collapsible container of claim 15, wherein the one or more metal layers (10) are aluminium and/or the one or more metal oxide or ceramic layers (11) are chosen from AlxOy and SiOx and/or the one or more layers of barrier lacquers (12) are chosen from water insoluble polyvinyl alcohol based lacquers.

18. The collapsible container of claim 15, wherein the metal or metal oxide or ceramic layers have a thickness of 20 to 80 nm.

19. The collapsible container of claim 1, wherein the barrier layer (7) is a barrier foil laminate of at least two independently selected polyolefin comprising oriented barrier foils (71, 72) that can be the same foil or different foils, said oriented barrier foils (71, 72) being selected from polyolefin monolayer foils (71), polymeric coextruded foils (72), and combinations thereof, said at least two barrier foils optionally comprising one or more functional layers on at least one of their surfaces so that the resulting laminate optionally comprises functional layers on at least one of its surfaces and/or one or more internal functional layer(s).

20. The collapsible container of claim 19, wherein the polymeric coextruded foils (72) comprise an ethylene vinyl alcohol layer between two polyolefin layers, in particular a mono-directional oriented polyethylene-ethylene vinyl alcohol copolymer (MDO-PE-EVOH) foil with an EVOH layer between two PE-layers and preferably a PE-tie layer-EVOH-tie layer-PE foil.

21. The collapsible container of claim 19, wherein the polyolefin monolayer foils (71) are selected from a mono-directional oriented polypropylene (OPP) foil, a bi-directional oriented polypropylene (BOPP) foil, and a mono-directional oriented polyethylene-foil (MDO-PE), in particular a monolayer foil selected from a mono-directional oriented polypropylene (OPP) foil and a bi-directional oriented polypropylene (BOPP) foil.

22. A container laminate (1) for the collapsible container of claim 1 or the container body of claim 7, that is a laminate having at least three layers, an inner polypropylene layer (6) and an outer polypropylene layer (8) and a barrier layer (7) sandwiched between the outer polypropylene layer (8) and the inner polypropylene layer (6), wherein the barrier layer (7) comprises at least one, optionally coextruded, polyolefin comprising oriented barrier foil (71, 72) and wherein at least 70% by weight of the container laminate is made of one or more polypropylenes, said polypropylenes being selected from homopolymers and/or copolymers.

23. The container laminate of claim 22, having the structure:
    PP or PP-EVOH-barrier layer-PP, such as PP or PP-EVOH-adhesive-barrier layer-adhesive-PP with the barrier layer being an, optionally and preferably functionalized, mono-directional oriented or bi-directional oriented monolayer foil or coextruded foil, said monolayer or coextruded foil preferably being selected from a MDO-PE foil, a MDO-PE-EVOH foil, an OPP foil and a BOPP foil with the optional functionalization being applied to at least one surface and being selected from the group comprising metallization, ceramic layer, metal oxide layer, barrier lacquer layer and combinations thereof, or a laminate of optionally functionalized barrier foils.

* * * * *